United States Patent [19]
Spencer et al.

[11] Patent Number: 5,647,609
[45] Date of Patent: Jul. 15, 1997

[54] INFLATABLE RESTRAINT CUSHION

[75] Inventors: Graham Thornton Spencer, Tipp City; Margaret Ann Fisher, Dayton; James Lloyd Webber, Centerville, all of Ohio

[73] Assignee: General Motors Corporation, Detroit, Mich.

[21] Appl. No.: 689,967

[22] Filed: Aug. 16, 1996

[51] Int. Cl.[6] .................................................. B60R 21/22
[52] U.S. Cl. .................................... 280/730.2; 280/730.1
[58] Field of Search ............................ 280/730.2, 730.1, 280/743.1, 728.1

[56] References Cited

U.S. PATENT DOCUMENTS

| | | | |
|---|---|---|---|
| 3,897,961 | 8/1975 | Leising et al. | 280/730.1 |
| 4,966,388 | 10/1990 | Warner et al. | 280/730.1 |
| 5,161,821 | 11/1992 | Curtis | 280/730.2 |
| 5,322,322 | 6/1994 | Bark et al. | 280/730.1 |
| 5,333,899 | 8/1994 | Witte | 280/730.1 |
| 5,496,061 | 3/1996 | Brown | 280/730.2 |
| 5,524,924 | 6/1996 | Steffens, Jr. et al. | 280/730.2 |
| 5,575,497 | 11/1996 | Suyama et al. | 280/730.1 |

FOREIGN PATENT DOCUMENTS

| | | | |
|---|---|---|---|
| 4-110252 | 4/1992 | Japan | 280/730.1 |
| 5-139232 | 6/1993 | Japan | 280/730.2 |
| 6-227348 | 8/1994 | Japan | 280/730.2 |

*Primary Examiner*—Christopher P. Ellis
*Attorney, Agent, or Firm*—Kathryn A. Marra

[57] ABSTRACT

An inflatable restraint cushion for restraining a vehicle occupant is used in a vehicle having a vehicle side structure including a door having a beltline portion defining a lower boundary of a side window opening. The cushion includes an inboard contact face for inflation adjacent the vehicle occupant and an opposite outboard contact face for inflation adjacent the vehicle door. The outboard contact face includes a generally horizontally extending beltline notch portion shaped for matably aligning with and engaging the beltline portion of the door when the cushion is inflated. Upon engagement of the cushion by the occupant, the beltline notch portion of the cushion reacts against and is laterally and vertically supported by the beltline portion of the door to provide lateral stability to the cushion.

20 Claims, 4 Drawing Sheets

INFLATABLE RESTRAINT CUSHION

This invention relates to an inflatable restraint cushion for side impact protection of a vehicle occupant.

BACKGROUND OF THE INVENTION

It is well known in motor vehicles to provide an air bag module for protecting a vehicle occupant. It is also known to provide an air bag module including an inflatable restraint cushion and an inflator for generating gas to inflate the cushion upon sensing predetermined vehicle conditions. It is also known to provide air bag modules for side impact protection of the vehicle occupant.

The prior art side air bag modules typically include restraint cushions which protect the torso portion of the occupant and a separate cushion that protects the head portion of the occupant. Thus, a vehicle typically includes multiple restraint cushions to protect both the head and torso portions of the occupant which adds complexity to the side structure assembly. In addition, the typical head restraint cushion includes elaborate and complex attachment systems to the door, roof pillar, side pillars or other vehicle side structures by means of tethers, hook and loop fasteners, pivot pins, or other mechanical fastening devices to hold the cushion in a relatively stable lateral position to minimize lateral displacement of the cushion out through a window opening in the door during deployment.

The prior art has also suggested an air bag module having a single cushion which protects both the torso and head of the occupant, but which does not rely upon interaction with vehicle side structure for lateral restraint of the cushion. Instead, the cushion includes an external tether, adjacent the occupant, which is engaged by the occupant such that the cushion is pulled towards the vehicle occupant by the tether. The torso of the occupant initially engages the tether and pulls the upper portion of the cushion towards the head of the occupant such that the head is caught by the cushion. Such a cushion includes an upper portion and a lower portion and a tether being external to the cushion. The tether includes an upper end connected to the upper portion of the cushion and a lower end connected to the lower portion of the cushion. The tether is also located adjacent a vehicle occupant when the cushion is deployed such that the occupant engages the tether and the ends of the tether pull the cushion towards the occupant. Accordingly, this arrangement is designed to provide lateral support for the cushion while reducing reliance on interaction of the cushion with the vehicle side structure.

SUMMARY OF THE INVENTION

This invention provides advantages and alternatives over the prior art by providing a single inflatable restraint cushion which provides side impact protection for both the head and torso portions of the vehicle occupant so that multiple cushions are not needed. Advantageously, the cushion is designed and shaped to interact with a beltline portion of a vehicle door structure to provide lateral support to the cushion during interaction with a vehicle occupant. Unlike prior art cushions, this cushion is designed to take full advantage of the shape of the beltline portion of the door structure for lateral and vertical positioning and support of the cushion during inflation, especially during the absence of a side window glass. Advantageously, this cushion is lightweight, compact, and simple to manufacture and assemble since it does not include any complex external fastening devices to laterally position and support the cushion during inflation.

These advantages are accomplished in the present invention by providing an inflatable restraint cushion for restraining a vehicle occupant. The cushion is for use in a vehicle having a vehicle side structure including a door having a beltline portion defining a lower boundary of a side window opening. The cushion includes an inboard contact face for inflation adjacent the vehicle occupant and an opposite outboard contact face for inflation adjacent the vehicle door. The outboard contact face includes a generally horizontally extending beltline notch portion shaped for matably aligning with and engaging the beltline portion of the door when the cushion is inflated. Upon engagement of the cushion by the occupant, the beltline notch portion of the cushion reacts against and is laterally and vertically supported by the beltline portion of the door to provide lateral stability to the cushion.

In accordance with other preferred aspects of the invention, the cushion includes an upper portion extending generally above the beltline portion of the door when the cushion is inflated and a lower portion extending generally below the beltline portion of the door when the cushion is inflated. Preferably, the beltline notch portion is located at the intersection of the upper and lower portions on the outboard contact face. Preferably, the beltline notch portion extends the entire longitudinal width of the outboard contact face.

In accordance with yet other preferred aspects of the invention, the cushion includes an internal tether extending between the inboard contact face and the outboard contact face. The tether includes a first end secured to the outboard contact face and a second end secured to the inboard contact face. The first end of the tether biases the outboard contact face towards the inboard contact face for defining the beltline notch portion. Preferably, the first end of the tether has a longitudinal width greater than a longitudinal width of the second end of the tether, the second end of the tether is spaced vertically above the first end of the tether when the cushion is inflated, and the first end of the tether and the beltline notch portion each extend the entire longitudinal width of the outboard contact face. Preferably, the second end of the tether biases the inboard contact face of the cushion towards the outboard contact face for defining an indented pocket portion on the inboard contact face. Also preferably, the indented pocket portion on the inboard contact face is spaced above the notched beltline portion on the outboard contact face, and the second end of the tether and the indented pocket portion each extend partially across the longitudinal width of the inboard contact face.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
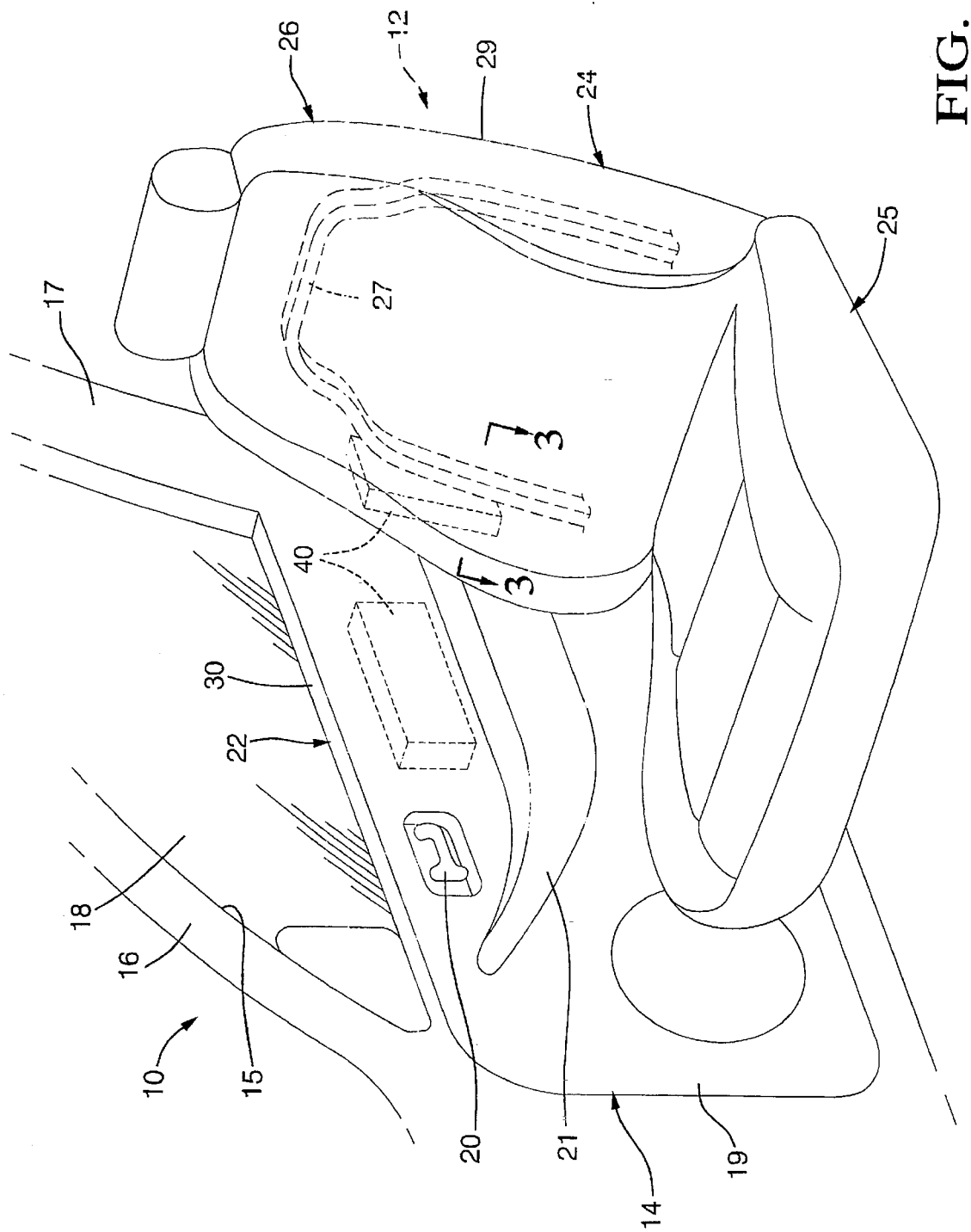
FIG. 1 is a perspective view of a vehicle interior partially broken away and including an air bag module in an undeployed condition located in a seat back and showing in phantom lines the air bag module alternately located in a vehicle door.

Referring to FIG. 1, it is seen that a vehicle 10 includes a vehicle interior 12 having a door 14 including a generally vertical front side door pillar 16 and a generally vertical rear side door pillar 17 for defining a side window opening 15. A generally horizontal and longitudinally extending beltline portion 22 extends between the front and rear side door pillars 16, 17. The beltline portion 22 has an upwardly facing surface 30 defining a lower boundary of the side window opening 15. A movable glass window 18 is mounted on the door 14 between the front and rear side door pillars 16, 17 for moving between an open position below the beltline portion 22 and a closed position extending substantially above the beltline portion 22 and closing the window opening 15. The door 14 also includes an inner door panel 19 for mounting a door handle 20 and an armrest 21. The armrest 21 is spaced below the beltline portion 22 of the door 14.

Figure 2:
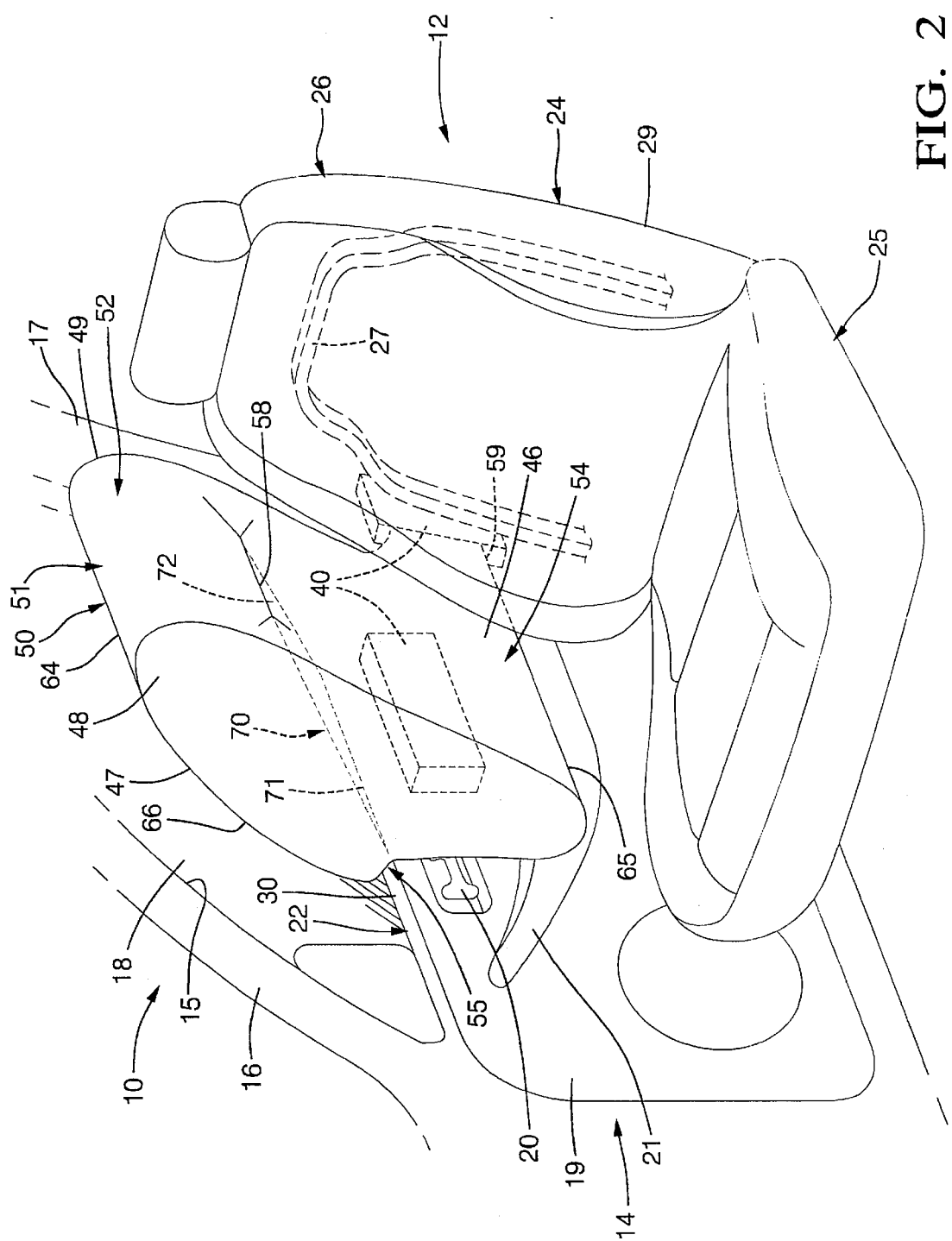
FIG. 2 is a view similar to FIG. 1, but showing the air bag module in the deployed condition and revealing an inflated restraint cushion having an internal tether.
Figure 3:
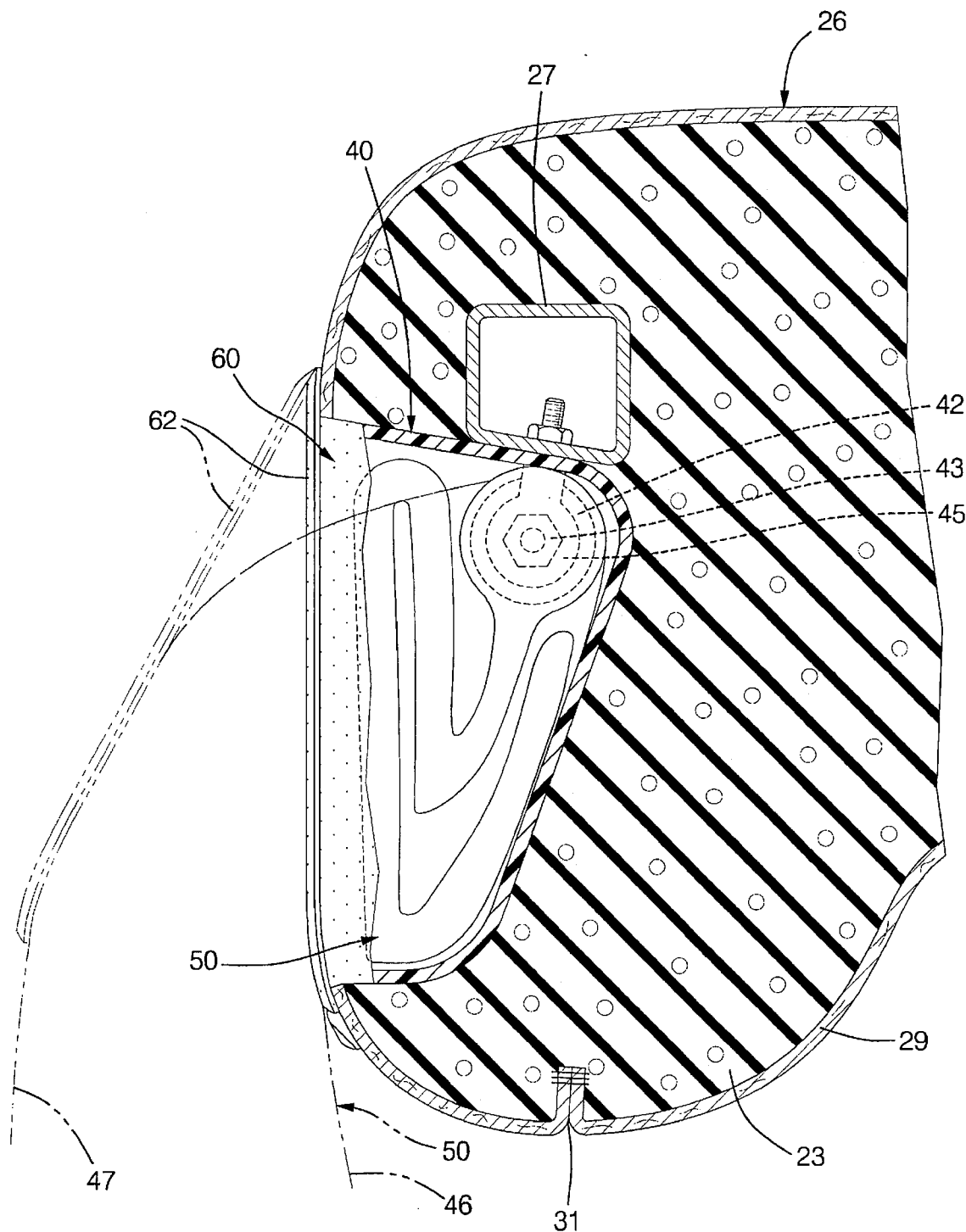
FIG. 3 is a cross-sectional view taken along line 3—3 of FIG. 1 and showing the cushion and a cover door in the undeployed condition in solid lines and showing the cushion and cover door in the deployed condition in phantom lines.
Figure 4:
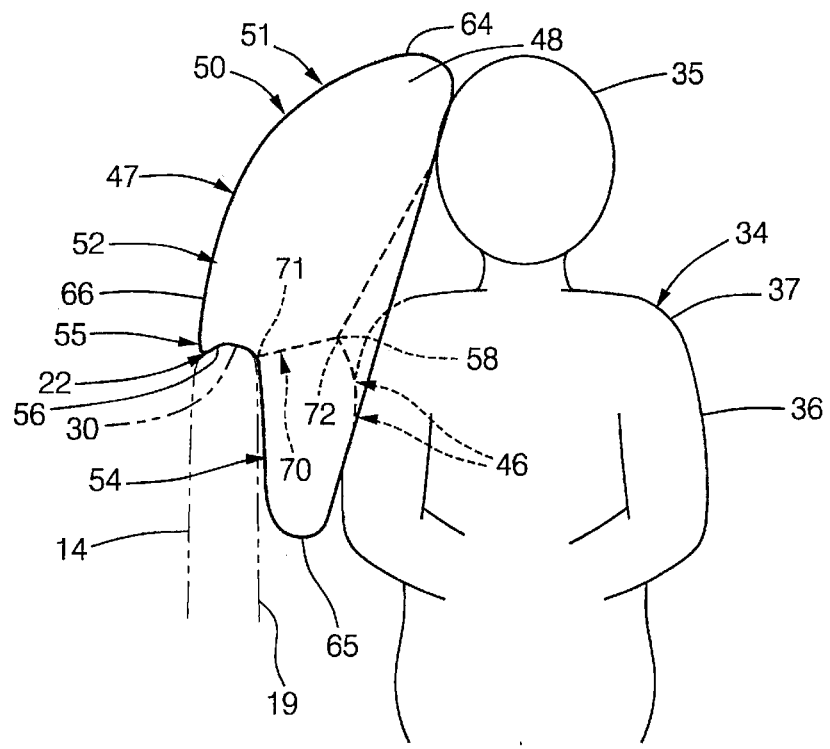
FIG. 4 is a schematic front view of the restraint cushion in the inflated condition and showing interaction with a vehicle occupant and interaction with a beltline portion of the vehicle door.

Referring to FIGS. 1 and 2, the vehicle interior 12 further includes a seat 24 having a lower seat bottom 25 and an upper seat back 26. As best shown in FIG. 3, the seat back 26 includes a rigid seat frame 27, preferably being metal, and encompassed within foam material 23 covered by fabric seat material 29 defining the outer surface of the seat back 26. With reference to FIGS. 1, 2 and 4, a vehicle occupant 34 may be seated in the seat 24. The occupant 34 includes an upper head portion 35, a lower torso portion 36, and a shoulder portion 37 at approximately the intersection of the head and torso portions 35, 36.

Referring to FIG. 1, an air bag module 40 according to the present invention is shown in the undeployed condition and is preferably mounted to the seat frame 27 of the seat back 26. However, it will also be appreciated that the air bag module 40 may alternately be mounted anywhere in the vehicle 10, but is especially well-adapted to also be mounted in various locations in the door 14 as shown in phantom lines in FIG. 1, but could also be mounted in the seat bottom 25, roof pillar or vehicle side pillar structure (not shown).

As best shown in FIG. 3, the air bag module 40 includes the basic component parts of an inflator 42, a mounting bracket 45, an inflatable restraint cushion 50, and a plastic molded housing 60 including an integrally molded cover door 62. The inflator 42 and the cushion 50 are preferably stored in the housing 60 prior to cushion 50 deployment.

Referring to FIG. 3, the housing 60 is preferably secured to the seat frame 27 or other suitable vehicle structure via the mounting bracket 45. The inflator 42 may be of any conventional construction which contains chemicals for igniting to generate gas for discharge upon sensing certain vehicle conditions, such as a predetermined amount of lateral deceleration of the vehicle 10. The inflator 42 preferably has a hybrid construction being generally cylindrical in shape and including ports (not shown) at one end through which the inflator gas is discharged to inflate the cushion 50. The inflator 42 is anchored to the housing 60 and the seat frame 27 via the mounting bracket 45 which preferably traps the inflator 42 in apertured ends with the inflator 42 secured thereto, such as by a nut 43.

As best shown in FIG. 3, the housing 60 is preferably integrally molded of a plastic material and preferably includes an integrally molded cover door 62 which includes weakened portions that permit the cover door 62 to break open upon cushion 50 deployment as shown in phantom lines in FIG. 3. The cover door 62 preferably provides a show surface on the outer surface of the seat back 26. However, it will be appreciated that the housing 60 could also be stored beneath the foam material 23 or fabric seat material 29. It will also be appreciated that the housing 60 could be eliminated and that the module 40 could be a soft-pack type including the inflator 42, mounting bracket 45, and cushion 50 with the cushion 50 deploying through a frangible portion of the seat 24 such as a seam 31. It will further be appreciated that a soft-pack module 40 could consist of the inflator 42 and the cushion 50 attached to the inflator 42 with the inflator 42 being mounted directly to the seat frame 27.

As best shown in FIG. 2, the cushion 50 is preferably made of an air bag fabric material which is suitable for inflatable cushion 50 construction. The cushion 50 includes a central cushion portion 51 having an inboard contact face 46 adjacent the vehicle occupant 34, an opposite outboard contact face 47 adjacent the vehicle door 14. The central cushion portion 51 of the cushion 50 includes an upper cushion edge 64 and a lower cushion edge 65 formed at the intersection of the inboard and outboard contact faces 46, 47. The cushion 50 further includes narrower forward and rearward faces 48, 49 which may be integral with the central cushion portion 51 or which may be made of separate panels sewn to the central cushion portion 51.

The cushion 50 includes an upper portion 52 generally for engagement with the head portion 35 of the occupant 34 and a lower portion 54 generally for engagement with the torso portion 36 of the occupant 34. The upper portion 52 is generally vertically aligned with the head portion 35 of the occupant 34 and is located substantially above the beltline portion 22 of the door 14 and extends between the beltline portion 22 and the vehicle roof (not shown). The lower portion 54 is generally vertically aligned with the torso portion 36 of the occupant 34 and is located substantially below the beltline portion 22 of the door 14. The lower portion 54 generally extends between the beltline portion 22 and the armrest 21. The upper and lower portions 52, 54 of the cushion 50 are preferably integrally formed from the same sheet or sheets of fabric material and are in fluid communication with each other such that inflator gas may pass therebetween. An inflator opening 59, as shown in FIG. 2, may be included at any appropriate location on the cushion 50 for being in fluid communication with the inflator 42 and for receiving inflator gas therein to inflate the cushion 50. The inflator opening 59 is preferably located on the lower portion 54 of the cushion 50 adjacent the vehicle seat 24 when the module 40 is mounted in the seat 24 or adjacent the door 14 when the module 40 is mounted on the door 14.

The outboard contact face 47 of the cushion 50 is shaped and contoured to match the shape and contour of the beltline portion 22 and the inner door panel 19 of the door 14. More specifically, the outboard contact face 47 includes a generally horizontal and longitudinally extending beltline notch portion 55 located generally at the intersection of the upper and lower portions 52, 54 of the cushion 50. The beltline notch portion 55 gives the outboard contact face 47 a generally concave shape. The beltline notch portion 55 preferably extends along the entire longitudinal width of the outboard contact face 47 of the cushion 50. The beltline notch portion 55 provides a generally horizontal and longitudinally extending beltline surface 56. The beltline surface 56 faces downwardly when the cushion 50 is in the inflated condition. The beltline notch portion 55 is contoured and shaped for matably engaging the beltline portion 22 of the door 14. The lower portion 54 of the cushion 50 on the outboard contact face 47 is spaced inwardly from the upper portion 52 of the cushion 50 on the outboard contact face 47. The lower portion 54 on the outboard contact face 47 is shaped and contoured for matably engaging the inner door panel 19 when the cushion 50 is inflated.

Prior to cushion 50 inflation, the cushion 50 is preferably stored within the housing 60 in a folded condition as best shown in FIG. 3. To fold the cushion 50, the cushion 50 is preferably flattened with the inboard and outboard contact faces 46, 47 lying atop each other. Next, the cushion 50 is pleat-folded downwardly from the upper cushion edge 64 and upwardly from the lower cushion edge 65 until the cushion 50 is approximately the same vertical height as the inflator 42. Then, the cushion 50 is preferably folded towards the inflator 42 to the shape shown in the top view of FIG. 3 by essentially folding the cushion 50 in half twice. However, it will be appreciated that any suitable cushion fold may be used which compactly folds the cushion 50 to fit within the available packaging space.

When the cushion 50 is in the inflated condition as best shown in FIGS. 2 and 4, the beltline notch portion 55 of the cushion 50 engages and partially wraps around the beltline portion 22 of the door 14 to provide lateral and vertical support to the cushion 50, especially to the upper portion 52 of the cushion 50 during interaction with the head portion 35 of the occupant 34 to prevent lateral bending of the upper portion 52 of the cushion 50 out through the window opening 15. When the beltline notch portion 55 engages the beltline portion 22 of the door 14, it will be appreciated that the beltline surface 56 provides a reaction surface which supports the vertically downward and laterally outward loads on the cushion 50 due to interaction with the occupant 34.

The inboard contact face 46 of the cushion 50 preferably includes an indented pocket portion 58 which is preferably spaced vertically above the beltline notch portion 55 on the outboard contact face 47. The indented pocket portion 58 preferably does not extend the entire longitudinal width of the inboard contact face 46, but instead extends across a middle portion of the longitudinal width of the inboard contact face 46 to prevent a bendable hinge point from being formed at the intersection of the upper and lower portions 52, 54 of the cushion 50 and to provide increased lateral stiffness to the cushion 50. Advantageously, the indented pocket portion 58 forms an indentation in the inboard contact face 46 of the cushion 50 which is approximately aligned with the shoulder portion 37 of the occupant 34 such that the lower portion 54 of the cushion 50 is located slightly further outboard than the upper portion 52 of the cushion 50. Thus, the upper portion 52 of the cushion 50 above the indented pocket portion 58 is located more laterally inboard such that the torso portion 36 of the occupant 34 does not push the cushion 50 away prior to the head portion 35 of the occupant 34 making contact with the cushion 50 on the inboard contact face 46.

As best shown in FIG. 4, when the head portion 35 of the occupant 34 makes contact with the inflated cushion 50, a vertically downward and laterally outward force is applied to the upper portion 52 of the cushion 50. Advantageously, these forces are transferred to the beltline surface 56 of the beltline notch portion 55 of the cushion 50 which reacts against the beltline portion 22 of the door 14 to minimize outboard and downward movement of the upper portion 52 of the cushion 50 away from the head portion 35 of the occupant 34.

Figure 5:
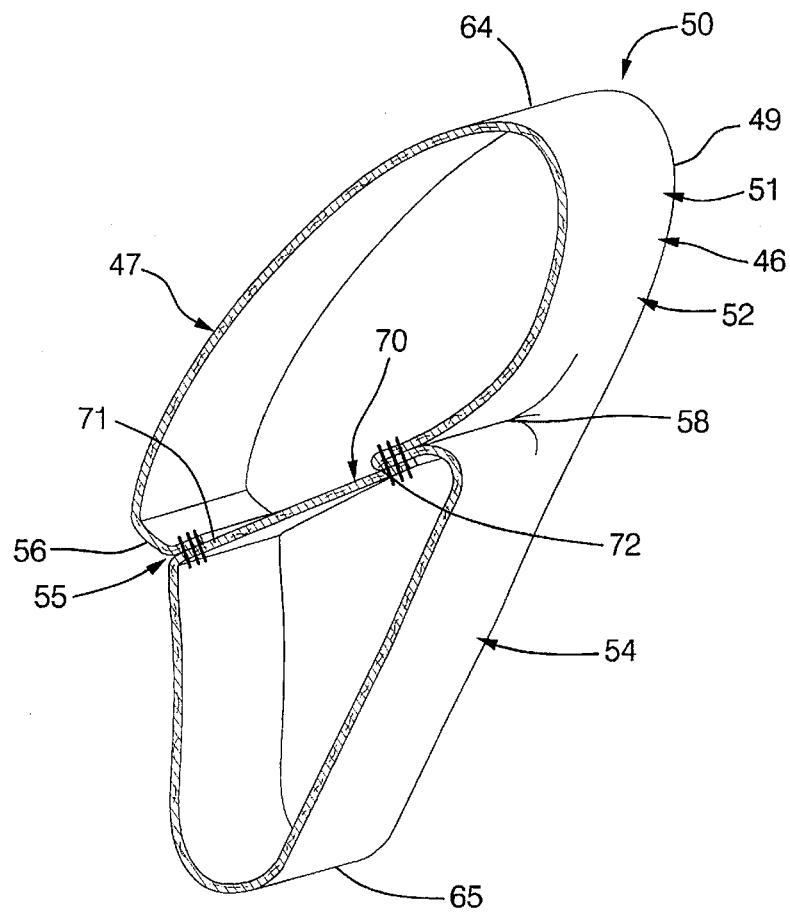
FIG. 5 is a broken-away perspective view of the restraint cushion in the inflated condition and showing an internal tether.

The cushion 50 most preferably includes an internal tether 70 which is preferably a continuous sheet of flexible, foldable fabric material and which is preferably sewn onto an internal surface of the cushion 50. More specifically, the tether 70 includes a first end 71 secured to the outboard contact face 47 of the cushion 50 to form the beltline notch portion 55 on the outboard contact face 47 of the cushion 50. The tether 70 also includes a second end 72 secured to the inboard contact face 46 of the cushion 50 and to form the indented pocket portion 58 of the cushion 50. As best shown in FIG. 5, the indented pocket portion 58 may be formed by pleating the inboard contact face 46 inwardly and sewing the second end 72 of the tether 70 thereto. The second end 72 of the tether 70 is preferably located vertically higher than the first end 71 of the tether 70 such that the indented pocket portion 58 is preferably positioned slightly higher than the beltline notch portion 55 on the outboard contact face 47. It will be appreciated that the tether 70 may be a separate piece sewn into the cushion 50 or may be a continuous extension of the cushion material.

Preferably, the second end 72 of the tether 70 has a longitudinal width which is shorter than a longitudinal width of the first end 71 of the tether 70 which forms the beltline notch portion 55. Thus, the first end 71 of the tether 70 preferably extends the entire width of the outboard contact face 47 to form the beltline notch portion 55. The second end 72 of the tether 70 preferably extends less than the width of the inboard contact face 46 of the cushion 50 to provide the indented pocket portion 58. Thus, the tether 70 has a generally trapezoidal shape which forms forward and rearward flow paths between the tether 70 and the forward and rearward faces 48, 49 of the cushion 50 for permitting the inflator gas to pass between the upper and lower portions 52, 54 of the cushion 50. As best shown in FIGS. 4 and 5, the tether 70 restricts the lateral length of the cushion 50, particularly at the intersection of the upper and lower portions 52, 54 of the cushion 50. Thus, as shown in FIG. 4, when an occupant 34 engages the inboard contact face 46 of the cushion 50, the shoulder portion 37 of the occupant 34 preferably goes approximately into the indented pocket portion 58 and the forward and rearward faces 48, 49 form an envelope around the occupant 34. In addition, engagement of the shoulder portion 37 of the occupant 34 with the indented pocket portion 58 causes the upper portion 52 of the cushion 50 to rotate towards the head portion 36 of the occupant 34. The load from the head and torso portions 35, 36 of the occupant 34 cause the beltline notch portion 55 of the cushion 50 to react against the beltline portion 22 of the door such that the cushion 50 is laterally and vertically supported by the beltline portion 22 of the door 14 to provide lateral stability to the cushion 50 and limit movement of the upper portion 52 of the cushion 50 out through the window opening 15.

Also advantageously, the second end 72 of the tether 70 forming the indented pocket portion 58 biases the lower portion 54 of the cushion 50 towards the outboard direction. Thus, the upper portion 52 of the cushion 50 is preferably located slightly inboard of the lower portion 54 of the cushion 50 in the inflated condition. Thus, as best shown in FIG. 4, the head portion 35 of the occupant 34 will contact the upper portion 52 of the cushion 50 sooner. Advantageously, the contact of the torso portion 36 with the cushion 50 does not push away the upper portion 52 of the cushion 50 away from contact with the head portion 35. Upon contact, the head portion 35 of the occupant 34 places an outboard lateral load on the upper portion 52 of the cushion 50 that will tend to rotate the upper portion 52 of the cushion 50 in the outboard and downward directions. Advantageously, when the head portion 35 loads the upper portion 52 of the cushion 50, the beltline notch portion 55 of the cushion 50 engages the beltline portion 22 of the door 14 and provides lateral and vertical support to the upper portion 52 of the cushion 50 to limit the lateral movement of the cushion 50 and to provide lateral stability.

Advantageously, the cushion 50 having the beltline notch portion 55 is shaped and contoured to react against the beltline portion 22 of the door 14 to provide lateral stability to the cushion 50 during interaction with the occupant 34 without the use of complex external tethers or fastening devices. Also advantageously, a single internal tether 70 forms the features of the beltline notch portion 55 on the outboard contact face 47 and the indented pocket portion 58 on the inboard contact face 46. It will be appreciated that the forward and rearward faces 48, 49 are preferably cut to include the shape of the beltline notch portion 55 on outboard edges 66, as best shown in FIG. 2, to assist the outboard contact face 47 in maintaining the shape of the beltline notch portion 55.

Upon the vehicle 10 experiencing certain predetermined conditions, the inflator 42 generates inflator gas which is discharged into the inflator opening 59 of the cushion 50 and preferably directly into the lower portion 54 of the cushion 50. The force of the deploying cushion 50 breaks out through the cover door 62 as shown in FIG. 3 and the cushion 50 deploys in a generally forward and laterally outboard direction between the door 14 and the occupant 34.

When an occupant 34 is seated in the normal seating position during certain side impact events in which the cushion 50 is deployed, the occupant 34 moves towards the cushion 50 and the shoulder portion 37 of the occupant 34 approximately engages the indented pocket portion 58 of the cushion 50. As shown in FIG. 4, this occupant 34 engagement causes the upper portion 52 of the cushion 50 to move laterally inboard towards the head portion 35 of the occupant 34. Thus, the upper portion 52 of the cushion 50 engages the head portion 35 of the occupant 34. Advantageously, it does not matter whether the glass window 18 is present during cushion deployment since the beltline notch portion 55 reacts against the beltline portion 22 of the door 14 to prevent the upper portion 52 of the cushion 50 from being pushed away from the head portion 35 of the occupant 34 by the torso portion 35.

Advantageously, only a single inflator 42 and single cushion 50 are required to provide side impact protection to both the head portion 35 and torso portion 36 of the occupant 34. Advantageously, this cushion 50 is lightweight, compact, and simple to manufacture and assemble since it does not include any complex external fastening devices to laterally position and support the cushion 50 during interaction with the occupant 34. Instead, the existing vehicle structure of the beltline portion 22 and the inner door panel 19 on the door 14 are fully utilized to provide lateral stability to the cushion 50.

It will be understood that a person skilled in the art may make modifications to the preferred embodiment shown herein within the scope and intent of the claims. It will be appreciated that although the cushion 50 is shown with the inboard contact face 46 having a centrally located indented pocket portion 58 extending partially across the inboard contact face 46, it will be appreciated that the indented pocket portion 58 may be eliminated or alternately may extend across the entire longitudinal width of the inboard contact face 46. It is only critical that the outboard contact face 47 includes the beltline notch portion 55 which is shaped for engaging and reacting against the beltline portion 22 of the door 14.

While only one internal tether 70 is shown, it will be appreciated that more than one tether may be used to form the beltline notch portion 55 and the indented pocket portion 58. While the cushion 50 is shown as constructed with the central cushion portion 51 and the tether 70 being constructed with one continuous piece of fabric material and with the forward and rearward faces 48, 49 each being constructed with other pieces of fabric material, it will be appreciated that the entire cushion 50 and tether 70 may be constructed of one or more pieces of fabric material which are suitably sewn or bonded together to provide the shape of the cushion 50 including the beltline notch portion 55.

While the present invention has been described as carried out in a specific embodiment thereof, it is not intended to be limited thereby but is intended to cover the invention broadly within the scope and spirit of the claims.

What is claimed is:

1. An inflatable restraint cushion for restraining a vehicle occupant having a head portion and a torso portion, the cushion for use in a vehicle having a vehicle side structure including a door having a beltline portion defining a lower boundary of a side window opening, the cushion comprising:

an inboard contact face for inflation adjacent the vehicle occupant; and an outboard contact face opposite the inboard contact face, the outboard contact face for inflation adjacent the vehicle door, the outboard contact face including a generally horizontally extending beltline notch portion shaped for matably aligning with and engaging the beltline portion of the door when the cushion is inflated whereby the beltline notch portion of the cushion reacts against and is laterally and vertically supported by the beltline portion of the door to provide lateral stability to the cushion upon engagement by the occupant.

2. The inflatable restraint cushion of claim 1 wherein the beltline portion of the door has an upwardly facing surface and wherein the beltline notch portion includes a downwardly facing beltline surface located on the upper portion of the cushion for engaging the upwardly facing surface of the beltline portion.

3. The inflatable restraint cushion of claim 1 wherein the cushion includes an upper portion extending generally above the beltline portion of the door when the cushion is inflated and wherein the cushion includes a lower portion extending generally below the beltline portion of the door when the cushion is inflated and wherein the beltline notch portion is located at the intersection of the upper and lower portions on the outboard contact face.

4. The inflatable restraint cushion of claim 1 wherein the outboard contact face includes a longitudinal width and wherein the beltline notch portion extends the entire longitudinal width of the outboard contact face.

5. The inflatable restraint cushion of claim 1 wherein the door includes an inner door panel extending downwardly from the beltline portion and wherein the cushion includes an upper portion located substantially above the beltline portion of the door and wherein the cushion includes a lower portion located substantially below the beltline portion of the door and wherein the beltline notch portion is located generally at the intersection of the upper and lower portions and wherein the beltline notch portion and the lower portion of the cushion are contoured and shaped for matching the beltline portion and inner door panel of the door, respectively, for engagement therewith when the cushion is contacted by the occupant for lateral and vertical support of the cushion.

6. The inflatable restraint cushion of claim 1 wherein the cushion includes an internal tether extending between the inboard contact face and the outboard contact face, the tether including a first end secured to the outboard contact face and a second end secured to the inboard contact face and wherein the first end of the tether biases the outboard contact face towards the inboard contact face for defining the beltline notch portion.

7. The inflatable restraint cushion of claim 6 wherein the first end of the tether has a longitudinal width greater than a longitudinal width of the second end of the tether.

8. The inflatable restraint cushion of claim 6 wherein the second end of the tether is spaced vertically above the first end of the tether when the cushion is inflated.

9. The inflatable restraint cushion of claim 6 wherein the first end of the tether and the beltline notch portion each extend the entire longitudinal width of the outboard contact face.

10. The inflatable restraint cushion of claim 6 wherein the second end of the tether biases the inboard contact face of the cushion towards the outboard contact face for defining an indented pocket portion on the inboard contact face.

11. The inflatable restraint cushion of claim 10 wherein the indented pocket portion on the inboard contact face is spaced above the notched beltline portion on the outboard contact face.

12. The inflatable restraint cushion of claim 10 wherein the inboard contact face has a longitudinal width and wherein the second end of the tether and the indented pocket portion each extend partially across the longitudinal width of the inboard contact face.

13. The inflatable restraint cushion of claim 1 wherein the inboard contact face includes an indented pocket portion.

14. The inflatable restraint cushion of claim 13 wherein the cushion includes an upper portion for contacting the head portion of the occupant and a lower portion for contacting the torso portion of the occupant and wherein the indented pocket portion is located at the intersection of the upper and lower portions on the inboard contact face.

15. The inflatable restraint cushion of claim 1 wherein the cushion includes opposing, spaced apart forward and rearward faces extending between and interconnecting the inboard and outboard contact faces.

16. The inflatable restraint cushion of claim 15 wherein the forward and rearward faces each have outboard edges shaped to match the contour of the beltline notch portion on the outboard contact face.

17. An inflatable restraint cushion for restraining a vehicle occupant, the cushion for use in a vehicle having a vehicle side structure including a door having a beltline portion defining a lower boundary of a side window opening, the cushion comprising:

an upper portion for inflation generally above the beltline portion of the door;

a lower portion for inflation generally below the beltline portion of the door;

an inboard contact for inflation adjacent the vehicle occupant;

an outboard contact for inflation adjacent the door;

a tether being internal to the cushion, the tether having a first end secured to the outboard contact face and having a second end secured to the inboard contact face; and the outboard contact face including a generally horizontally extending beltline notch portion being an inwardly biased portion of the outboard contact face at the first end of the tether, the beltline notch portion shaped for matably engaging the beltline portion of the door when the cushion is inflated whereby the beltline notch portion of the cushion reacts against and is laterally and vertically supported by the beltline portion of the door to provide lateral stability to the cushion upon engagement by the occupant.

18. The inflatable restraint cushion of claim 17 wherein the second end of the tether provides an indented pocket portion on the inboard contact face, the indented pocket portion being spaced vertically above the beltline notch portion on the outboard contact face.

19. The inflatable restraint cushion of claim 18 wherein the second end of the tether is spaced vertically above the first end of the tether when the cushion is inflated.

20. The inflatable restraint cushion of claim 18 wherein the first end of the tether forming the beltline notch portion is wider than the second end of the tether forming the indented pocket portion.

* * * * *